Patented Mar. 3, 1942

2,275,135

UNITED STATES PATENT OFFICE 2,275,135

BUTADIENE EXTRACTION

Egi V. Fasce, Baton Rouge, La., assignor to Standard Oil Development Company, a corporation of Delaware No Drawing. Application April 18, 1940, Serial No. 330,312

8 Claims. (Cl. 260—680)

This invention relates to improvements in the recovery of diolefins from hydrocarbon mixtures containing the same and more particularly to improvements in a continuous process for the separation of butadiene from gaseous mixtures which contain both saturated and unsaturated hydrocarbons.

It is known that both mono-olefins and diolefins react with cuprous salts to form complex addition compounds. The cuprous salt may be used alone as a slurry with water or it may be used in the form of a clear solution. Cuprous salts such as the chloride are only slightly soluble in water. The introduction of mineral acids such as hydrochloric acid, or ammonia or alkanolamines such as monoethanolamine together with inorganic salts such as sodium chloride, ammonium chloride, ethanolamine hydrochloride, aid in the preparation of more concentrated clear solutions of cuprous salts. The neutral solutions of cuprous salts in water as well as the acid solutions of cuprous salts precipitate out the solid cuprous salt-diolefin complex. This necessitates separation of the solid complex by filtration or settling, followed by heating of the solid to recover the diolefin. This operation is relatively expensive in commercial practice for the extraction of olefins and diolefins from hydrocarbon gas mixtures. The alkaline solutions of cuprous salts which remain clear during absorption of gaseous olefinic and diolefinic hydrocarbons offer other difficulties in the case of ammoniacal solutions, especially in the recovery of ammonia from the exit gases from both absorption and desorption operations.

An object of the present invention is to provide a satisfactory commercial process for separating diolefins from hydrocarbon mixtures which may be operated in a continuous manner.

Another object of this invention is to provide a method whereby the diolefins are recovered in good yield and in a high state of purity and the absorbent solution may be used repeatedly.

Other objects of the present invention will be apparent from the following description.

According to the present invention, a hydrocarbon mixture containing both mono-olefins and diolefins and having about 4 carbon atoms to the molecule was fractionally separated from cracked petroleum fractions and contacted with a solution of cuprous salt such as cuprous chloride and organic nitriles, together with a solvent such as water or ethylene glycol, etc. The cuprous chloride forms definite compounds with the organic nitriles. The organic nitriles that may be used according to this invention are water-soluble nitriles. The specific organic nitrile that is preferred is acetonitrile. For example, an olefin gas consisting of 20.6% by volume of butadiene, 11.4% isobutylene, 41% normal butylene, and 27% normal butanes is bubbled through a cuprous salt-organic nitrile solution until the solution is saturated at about 50° F. Other temperatures of 30° to 60° F. may be used. The cuprous salt-nitrile solution is composed of 20% by weight of cuprous chloride, 70% by weight of acetonitrile and 10% by weight of water. After the solution is saturated, it remains clear and shows no precipitate formation. The clear saturated solution of cuprous salt-organic nitrile with the butadiene in solution is then heated to a temperature up to 160° F. and the liberated gas containing the butadiene is thereby separated, which gas on analysis showed at least 90% of unsaturated hydrocarbons and the amount of butadiene in this gas was raised from 20.6%, as found present in the original gas, to 51%. If desired to obtain pure butadiene, the separated gases can then be returned to contact a saturated solution of cuprous chloride-organic nitrile containing butadiene until all but the diolefins are driven off. Repeated extraction in this manner will result in a solution which upon being heated will yield a gas which is substantially pure butadiene of at least 90% purity.

Other cuprous chloride solutions may be used such as one containing 20% by weight of cuprous chloride, 10% calcium chloride, 30% ethylene glycol and 40% acetonitrile, which on being saturated with a pure butadiene gas at a temperature of about 50° F. will upon being subjected to a temperature of about 165° to 170° F. yield 3200 cc. of butadiene for each 85 cc. of the solution used which corresponds to 4.75 cubic feet of butadiene absorbed per gallon of solution.

The absorption capacity of the cuprous salt-organic nitrile solution for pure butadiene is relatively greater than that of other cuprous salt solutions. Super-atmospheric pressures may be used with corresponding higher temperatures. The absorption capacity is dependent upon the partial pressure of the butadiene in the feed.

The process may be carried out continuously, i. e. the cuprous salt-organic nitrile solution allowed to flow downwardly through a tower in countercurrent flow to the olefin mixture passing upwardly through the tower. The saturated cuprous salt-organic nitrile solution is passed to another tower and by lowering the pressure or raising the temperature or both the absorbed diolefin is recovered, the cuprous salt organic nitrile solution being continuously returned to the absorption tower to absorb more diolefins.

I claim:

1. A process for the recovery of diolefins from hydrocarbon mixtures containing the same, which comprises contacting a hydrocarbon mixture containing a diolefin with a clear solution of a cuprous salt and a water-soluble organic nitrile, and recovering the diolefins from the clear solution of the cuprous salt and water-soluble nitrile by known methods.

2. A process for the recovery of diolefins from hydrocarbon mixtures containing the same, which comprises contacting a hydrocarbon mixture containing a diolefin with a clear aqueous solution of a cuprous salt and a water-soluble organic nitrile, and recovering the diolefins from the clear aqueous solution of the cuprous salt and water-soluble nitrile by known methods.

3. A process for the recovery of diolefins from hydrocarbon mixtures containing the same, which comprises contacting a hydrocarbon mixture containing a diolefin with a clear aqueous solution of a cuprous chloride and a water-soluble organic nitrile, and recovering the diolefins from the clear aqueous solution of the cuprous chloride and water-soluble nitrile by known methods.

4. A process for the recovery of diolefins from hydrocarbon mixtures containing the same, which comprises contacting a hydrocarbon mixture containing a diolefin with a clear aqueous solution of a cuprous salt and acetonitrile, and recovering the diolefins from the clear solution of the cuprous salt and acetonitrile by known methods.

5. A process for the recovery of diolefins from hydrocarbon mixtures containing the same, which comprises contacting a hydrocarbon mixture containing diolefins with a clear solution of cuprous chloride and acetonitrile at a temperature of about 30° to 62° F. and recovering the diolefins from the clear solution of the cuprous salt and acetonitrile by subjecting to a temperature of about 160° F.

6. A process for the recovery of diolefins from hydrocarbon mixtures containing the same, which comprises contacting a hydrocarbon mixture containing a diolefin with a cuprous chloride and acetonitrile solution at a temperature of about 30° to 62° F. and pressure above atmospheric and recovering the diolefins from the clear solution of the cuprous salt and acetonitrile by subjecting to an elevated temperature and reduced pressure.

7. A process for the recovery of butadiene from a hydrocarbon mixture containing the same, which comprises contacting a hydrocarbon mixture containing butadiene with a cuprous salt nitrile solution composed of 20% by weight of cuprous chloride, 70% by weight of acetonitrile, and 10% by weight of water, and recovering the diolefins from the clear solution of the cuprous chloride, acetonitrile and water by subjecting to an elevated temperature.

8. A process for the recovery of butadiene from a hydrocarbon mixture containing the same, which comprises contacting a hydrocarbon mixture containing butadiene with a cuprous salt nitrile solution composed of 20% by weight of cuprous chloride, 10% by weight of calcium chloride, 30% ethylene glycol and 40% by weight of acetonitrile.

EGI V. FASCE.